US012800000B2

(12) United States Patent
Okada et al.

(10) Patent No.: US 12,800,000 B2
(45) Date of Patent: Nov. 17, 2026

(54) COIL SPRING, SUSPENSION DEVICE, AND METHOD FOR PRODUCING COIL SPRING

(71) Applicant: NHK SPRING CO., LTD., Yokohama (JP)

(72) Inventors: Hideki Okada, Yokohama (JP); Yuichiro Yamauchi, Yokohama (JP); Ryo Tanaka, Yokohama (JP); Takeshi Suzuki, Yokohama (JP); Kosuke Shibairi, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 348 days.

(21) Appl. No.: 18/399,940

(22) Filed: Dec. 29, 2023

(65) Prior Publication Data

US 2024/0133440 A1 Apr. 25, 2024
US 2024/0229884 A9 Jul. 11, 2024

Related U.S. Application Data

(63) Continuation of application No. PCT/JP2022/025447, filed on Jun. 27, 2022.

(30) Foreign Application Priority Data

Jul. 1, 2021 (JP) ................................ 2021-110012

(51) Int. Cl.
*F16F 1/04* (2006.01)
*B60G 11/14* (2006.01)

(52) U.S. Cl.
CPC .............. *F16F 1/042* (2013.01); *B60G 11/14* (2013.01); *B60G 2204/1244* (2013.01); *F16F 2226/023* (2013.01)

(58) Field of Classification Search
CPC ..... F16F 1/042; F16F 2226/023; B60G 11/14; B60G 2204/1244
USPC ....... 148/568, 580; 267/33, 166, 166.1, 167, 267/286
See application file for complete search history.

(56) References Cited

U.S. PATENT DOCUMENTS 10,294,540 B2 * 5/2019 Fuchigami .............. C22C 38/16
10,583,706 B2 3/2020 Tange et al.
2014/0306389 A1 * 10/2014 Ikai ......................... B21F 35/00 148/580
2015/0252863 A1 * 9/2015 Ono .......................... B21F 3/02 148/226

(Continued)

FOREIGN PATENT DOCUMENTS

CN 105431651 A 3/2016
CN 107532669 A 1/2018

(Continued)

OTHER PUBLICATIONS

Extended European Search Report (EESR) dated Oct. 2, 2024, issued in counterpart European Application No. 22833060.1.

(Continued)

*Primary Examiner* — Christopher P Schwartz
(74) *Attorney, Agent, or Firm* — Holtz, Holtz & Volek PC

(57) ABSTRACT

According to an embodiment, a coil spring is formed of a wire which is helically wound, and includes an end turn portion and an effective portion, and a surface of the wire in the end turn portion includes an area which is softer than a surface of the wire in the effective portion.

9 Claims, 7 Drawing Sheets

(56) References Cited

U.S. PATENT DOCUMENTS

| | | | | |
|---|---|---|---|---|
| 2015/0343871 | A1 | 12/2015 | Tange et al. | |
| 2020/0141463 | A1* | 5/2020 | Matsubara | F16F 1/06 |
| 2021/0362274 | A1* | 11/2021 | Sato | B23K 26/60 |
| 2025/0178068 | A1* | 6/2025 | Iwata | B21F 3/02 |
| 2025/0178069 | A1* | 6/2025 | Iwata | B21F 3/02 |
| 2025/0230850 | A1* | 7/2025 | Okabe | F16F 1/042 |

FOREIGN PATENT DOCUMENTS

| | | | | |
|---|---|---|---|---|
| DE | 102009011118 | A1 * | 5/2010 | C21D 8/06 |
| EP | 0798489 | A2 | 10/1997 | |
| JP | S62260020 | A | 11/1987 | |
| JP | H09264360 | A | 10/1997 | |
| JP | 2000283201 | A | 10/2000 | |
| JP | 2008023563 | A | 2/2008 | |
| JP | 2008214750 | A | 9/2008 | |
| JP | 2010133558 | A | 6/2010 | |
| JP | 2014122652 | A | 7/2014 | |
| JP | 6007097 | B2 | 10/2016 | |
| JP | 2019007081 | A | 1/2019 | |
| JP | 2019124363 | A | 7/2019 | |
| JP | 6587993 | B2 | 9/2019 | |
| JP | 2019173080 | A | 10/2019 | |
| WO | 2013099821 | A1 | 7/2013 | |
| WO | 2020026716 | A1 | 2/2020 | |

OTHER PUBLICATIONS

Japanese Office Action (and an English language translation thereof) dated Aug. 27, 2024, issued in counterpart Japanese Application No. 2023-159980.

International Search Report (ISR) (and English language translation thereof) and Written Opinion dated Aug. 16, 2022, issued in International Application No. PCT/JP2022/025447.

Chinese Office Action (and an English language translation thereof) dated Mar. 26, 2026, issued in corresponding Chinese Application No. 202280046227.2.

* cited by examiner

COIL SPRING, SUSPENSION DEVICE, AND METHOD FOR PRODUCING COIL SPRING

CROSS-REFERENCE TO RELATED APPLICATIONS

This application is a Continuation Application of PCT Application No. PCT/JP2022/025447, filed Jun. 27, 2022 and based upon and claiming the benefit of priority from prior Japanese Patent Application No. 2021-110012, filed Jul. 1, 2021, the entire contents of all of which are incorporated herein by reference.

BACKGROUND OF THE INVENTION

1. Field of the Invention

Embodiments described herein relate generally to a coil spring, a suspension device, and a method for producing a coil spring.

2. Description of the Related Art

For example, in the suspension devices of vehicles such as automobiles, coil springs are used. These types of coil springs are required to have good settling resistance and corrosion fatigue resistance.

When the hardness of a wire which forms a coil spring is increased as a whole, the improvement of settling resistance can be expected. However, in this case, for example, if a corrosion pit is generated on the surface of the wire as the coating film applied to the wire is partly removed, a crack could be generated in the wire based on the corrosion pit. If the hardness of the wire is high, the development of the crack is fast, and there is a possibility that the coil spring reaches early breakage. To the contrary, if the hardness of the wire is low as a whole, settling resistance is decreased.

As examples in which the settling resistance and corrosion fatigue resistance of coil springs are considered, a Patent Literature 1 (JP 6587993 B), a Patent Literature 2 (JP 2019-7081 A) and Patent Literature 3 (JP 2010-133558 A) are known. Each of Patent Literatures 1 and 2 discloses a wire (spring steel wire) comprising a first layer which is the surface, a second layer on an internal side relative to the first layer and a third layer which reaches the center on an internal side relative to the second layer such that the hardness of the second layer is lower than the hardnesses of the first layer and the third layer. According to Patent Literatures 1 and 2, fatigue characteristics are improved by the second layer, and settling resistance is improved by the first layer and the third layer.

Patent literature 3 discloses a wire (spring steel) in which the hardness is decreased from the internal side to the external side. According to Patent Literature 3, this configuration of the wire can delay the expansion of a crack on the surface of the wire.

Even if Patent Literatures 1, 2 and 3 are taken into consideration, the settling resistance and corrosion fatigue resistance of coil springs still have room for improvement. For example, in all of Patent Literatures 1, 2 and 3, the same layer structure is formed over the entire length of the wire. However, characteristics such as the settling resistance and corrosion fatigue resistance required for coil springs could differ depending on each portion of each coil spring such as an end turn portion or an effective portion.

All of Patent Literatures 1, 2 and 3 obtain the wire comprising a layer configuration in which the hardness differs partly by heating the wire by high-frequency induction heating. In this production method, it is difficult to control the temperature distribution within the section of the wire at the time of heating, and there is a possibility that a wire comprising the intended layer configuration cannot be obtained as a result.

One of the objects of this disclose is to provide a coil spring having excellent settling resistance and corrosion fatigue resistance, a suspension device comprising the coil spring, and further, a method for producing the coil spring.

BRIEF SUMMARY OF THE INVENTION

According to an embodiment, a coil spring is formed of a wire which is helically wound, and comprises an end turn portion and an effective portion, and a surface of the wire in the end turn portion comprises an area which is softer than a surface of the wire in the effective portion.

For example, the surface of the wire in the end turn portion comprises a first area, and a second area which is softer than the first area and is adjacent to the first area in a circumferential direction around an axis of the wire. The surface of the wire in the effective portion comprises the first area over a whole circumference in the circumferential direction.

The wire comprises a first layer including the first area, and a second layer which includes the second area and is softer than the first layer. Suitably, the axis of the wire passes through the first layer in the end turn portion.

The second area may be formed in at least part of a seat surface of the end turn portion. Suitably, the second area is formed at least in a range greater than or equal to 0.4 turns and less than or equal to 0.9 turns from an end of the wire in the end turn portion. Suitably, the second area has a thickness greater than or equal to 0.6 mm.

In a section of the wire including the first area and the second area, the surface of the wire comprises a first point which is, of a pair of intersection points of a first center line passing through the axis of the wire and parallel to a coil axis with the surface of the wire, an intersection point located on the effective portion side, a second point which is, of a pair of intersection points of a second center line passing through the axis of the wire and parallel to a radial direction around the coil axis with the surface of the wire, an intersection point located on a far side from the coil axis, a third point which is, of the pair of intersection points of the first center line with the surface of the wire, an intersection point located on a side opposite to the first point, and a fourth point which is, of the pair of intersection points of the second center line with the surface of the wire, an intersection point located on a side opposite to the second point. For example, a center of the second area is located between the third point and the fourth point in the circumferential direction passing through the first point, the second point, the third point and the fourth point in order. Suitably, the center of the second area is located between the third point and the fourth point in the circumferential direction.

According to an embodiment, a suspension device comprises a first spring seat, a second spring seat provided on an upper side in a perpendicular direction relative to the first spring seat, and the coil spring of one of claims 1 to 8, provided between the first spring seat and the second spring seat.

According to an embodiment, a method for producing a coil spring comprises forming a coil spring comprising an end turn portion and an effective portion by winding a wire helically, and softening part of the wire by locally applying laser light to a surface of the wire in at least part of the end turn portion, and forming, on the surface of the wire in the end turn portion, an area which is softer than the surface of the wire in the effective portion.

The disclosure can provide a coil spring having excellent settling resistance and corrosion fatigue resistance, a suspension device comprising the coil spring, and further, a method for producing the coil spring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments will be described with reference to the accompanying drawings. The embodiments exemplarily show a McPherson strut type suspension device, a coil spring used in the suspension device and a method for producing the coil spring. The coil spring disclosed in each embodiment may be used for other types of suspension devices and may be used for purposes other than suspension devices.

First Embodiment

Figure 1:
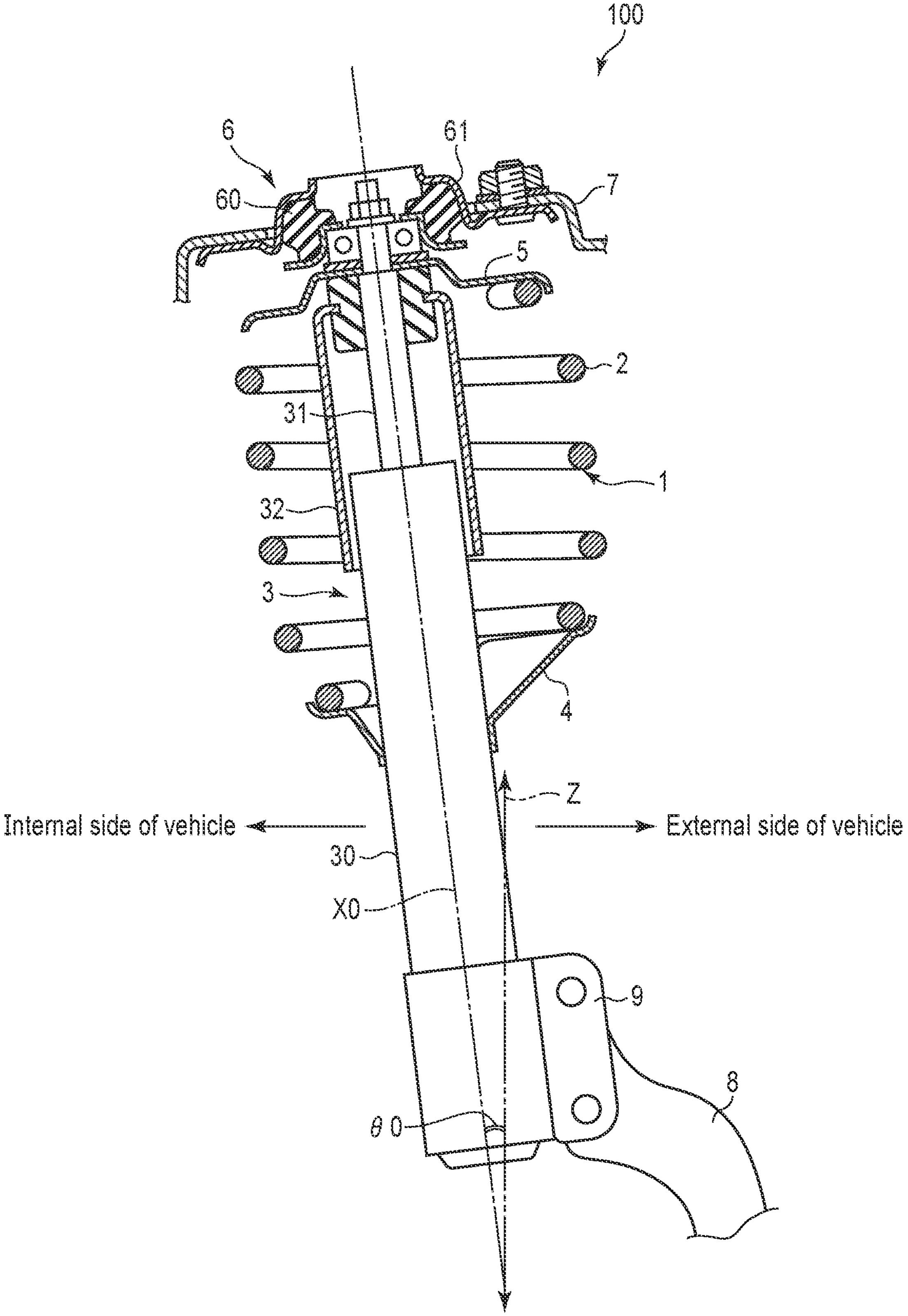
FIG. 1 is a schematic cross-sectional view of a suspension device according to a first embodiment.

FIG. 1 is a schematic cross-sectional view of a suspension device 100 according to a first embodiment. This suspension device 100 comprises a coil spring 1 for vehicle suspension. The coil spring 1 comprises a wire 2 which is helically wound. The wire 2 is formed of, for example, spring steel.

The suspension device 100 further comprises a shock absorber 3, a first spring seat 4 and a second spring seat 5. The second spring seat 5 is located above the first spring seat 4 in a perpendicular direction Z. The coil spring 1 is attached to the suspension device 100 in a state where it is compressed between the first spring seat 4 and the second spring seat 5.

The shock absorber 3 comprises a cylinder 30 which accommodates a fluid such as oil, a rod 31 inserted into the cylinder 30, a damping force generation mechanism provided inside the cylinder 30 and a cover member 32 which covers the sliding portion of the rod 31. The rod 31 can extend and contract parallel to the axis X0 of the shock absorber 3 relative to the cylinder 30. The damping force generation mechanism provides resistance relative to the motion of the rod 31.

The upper end portion of the shock absorber 3 is attached to a vehicle body 7 via a mount insulator 6. The mount insulator 6 comprises an antivibration rubber 60 and a support member 61 secured to the vehicle 7. The lower end portion of the shock absorber 3 is attached to a knuckle member 8 which supports an axle via a bracket 9. In the example of FIG. 1, the axis X0 of the shock absorber 15 inclines at angle θ0 which is an acute angle relative to the perpendicular direction Z.

The coil spring 1 is attached in a state where it is compressed between the first spring seat 4 and the second spring seat 5, elastically supports a load applied from the upper side, and extends and contracts in a range of a predetermined flexure amount (between a full-rebound and a full-bump) depending on the load.

Figure 2:
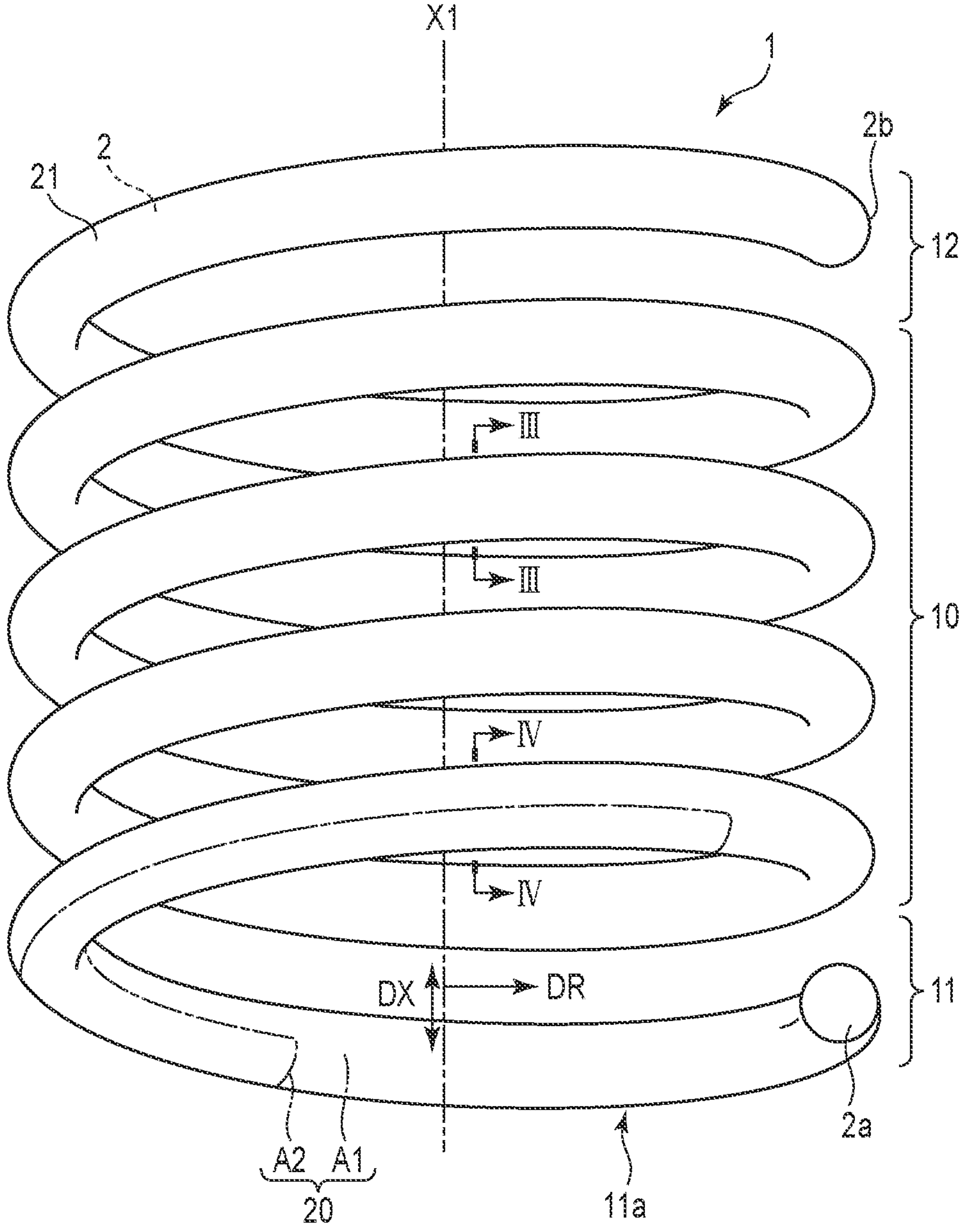
FIG. 2 is a schematic perspective view of a coil spring according to the first embodiment.
Figure 3:
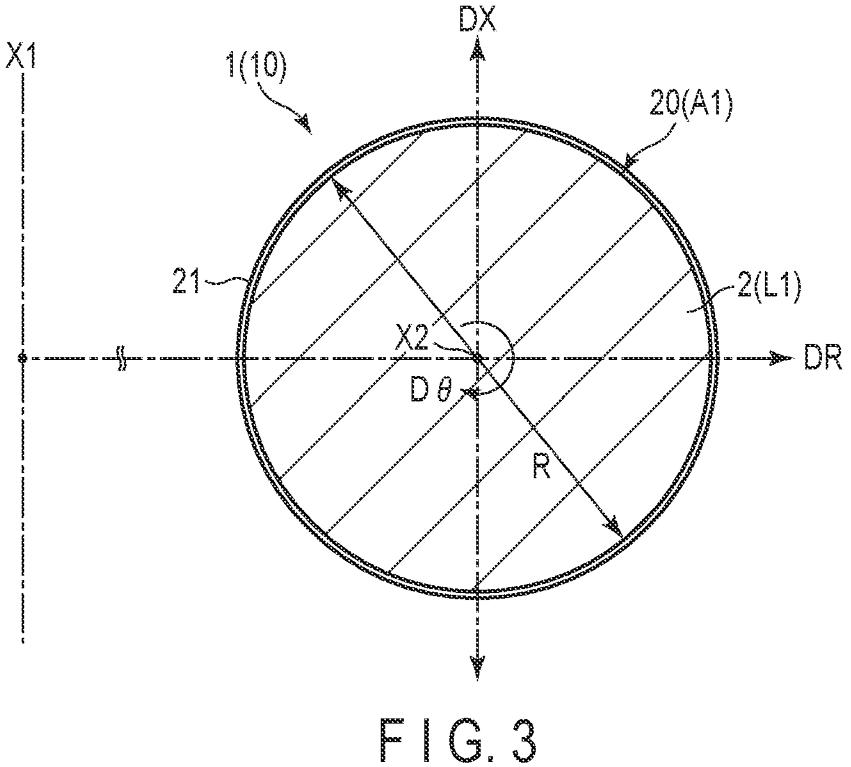
FIG. 3 is a schematic cross-sectional view of the coil spring along the III-III line of FIG. 2.
Figure 4:
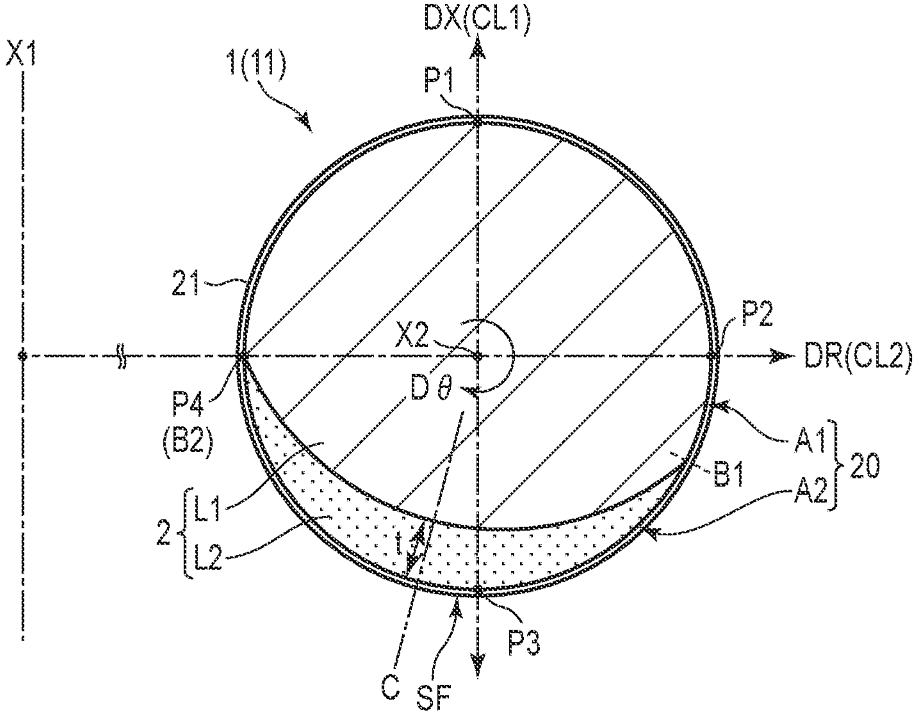
FIG. 4 is a schematic cross-sectional view of the coil spring along the IV-IV line of FIG. 2.

FIG. 2 is a schematic perspective view of the coil spring 1 according to the embodiment. FIG. 3 is a schematic cross-sectional view of the coil spring 1 along the III-III line of FIG. 2. FIG. 4 is a schematic cross-sectional view of the coil spring 1 along the IV-IV line of FIG. 2.

As shown in FIG. 2, the coil spring 1 comprises an effective portion 10, a first end turn portion 11 and a second end turn portion 12. The first end turn portion 11 is a portion which is in contact with the first spring seat 4. The second end turn portion 12 is a portion which is in contact with the second spring seat 5. The effective portion 10 is a portion which is located between the first end turn portion 11 and the second end turn portion 12.

In the embodiment, the first end turn portion 11 includes not only the portion which is in contact with the first spring seat 4 at all times but also a portion which separates from the first spring seat 4 when the compressive load applied to the coil spring 1 is less than a predetermined value and which is in contact with the first spring seat 4 when the compressive load applied to the coil spring 1 exceeds the predetermined value. Similarly, the second end turn portion 12 includes not only the portion which is in contact with the second spring seat 5 at all times but also a portion which separates from the second spring seat 5 when the compressive load applied to the coil spring 1 is less than a predetermined value and which is in contact with the second spring seat 5 when the compressive load applied to the coil spring 1 exceeds the predetermined value. For example, the first end turn portion 11 is a range of one turn from the lower end 2*a* the wire 2. The second end turn portion 12 is a range of one turn from the upper end 2*b* of the wire 2.

In the effective portion 10, the wire 2 is wound a plurality of times around a coil axis X1. For example, the coil axis X1 inclines so as to form an acute angle with respect to the perpendicular direction Z and the axis X0 of the shock absorber 3 shown in FIG. 1. Hereinafter, as shown in FIG.

2, an axial direction DX parallel to the coil axis X1 and a radial direction DR around the coil axis X1 are defined.

As shown in FIG. 3, the surface 20 of the wire 2 is covered with a coating film 21 as a whole. For example, the diameter R of the wire 2 is 10 to 15 mm, and the thickness of the coating film 21 is greater than or equal to 40 μm.

In the embodiment, the surface 20 of the wire 2 comprises a first area A1 and a second area A2 which is softer than the first area A1. In the example of FIG. 2, the second area A2 is provided in part of the first end turn portion 11. In the surface 20, the portion excluding the second area A2 is the first area A1.

In other words, in the surface 20 of at least part of the first end turn portion 11, the distribution of the hardness in a circumferential direction Dθ around the axis X2 of the wire 2 shown in FIG. 4 is not uniform. To the contrary, in the surface 20 of the second end turn portion 12 and the effective portion 10, the distribution of the hardness is uniform over the whole circumference of the circumferential direction Dθ.

As shown in FIG. 3, the wire 2 in the effective portion 10 is formed of a first layer L1 as a whole. The first area A1 corresponds to the surface of the first layer L1. The second end turn portion 12 is also formed of the first layer L1 as a whole.

As shown in FIG. 4, the first end turn portion 11 comprises a second layer L2 which is softer than the first layer L1 in addition to the first layer L1. The second area A2 corresponds to the surface of the second layer L2. In the example of FIG. 4, the proportion of the first layer L1 in the cross-sectional area of the wire 2 is greater than that of the second layer L2 in the cross-sectional area of the wire 2. The axis X2 of the wire 2 passes through the first layer L1.

As shown in FIG. 4, in the surface 20 of the wire 20, a first point P1, a second point P2, a third point P3 and a fourth point P4 are defined. The first point P1 is the closest position to the effective portion 10 located on the upper side of the axial direction DX in the surface 20. The second point P2 is the farthest position from the coil axis X1 in the radial direction DR. The third point P3 is the farthest position from the effective portion 10 in the axial direction DX (the position on the side opposite to the first point P1 across the intervening axis X2). The fourth point P4 is the closest position to the coil axis X1 in the radial direction DR (the position on the side opposite to the second point P2 across the intervening axis X2). The first point P1, the second point P2, the third point P3 and the fourth point P4 are arranged in order at intervals of 90 degrees in the circumferential direction D.

From another viewpoint, the first point P1 is, of a pair of intersection points of a first center line CL1 passing through axis X2 and parallel to the coil axis X1 with the surface 20, the intersection point located on the effective portion 10 side. The second point P2 is, of a pair of intersection points of a second center line CL2 passing through axis X2 and parallel to the radial direction DR with the surface 20, the intersection point located on the far side from the coil axis X1. The third point P3 is, of a pair of intersection points of the first center line Cl with the surface 20, the intersection point located on the side opposite to the first point P1. The fourth point P4 is, of a pair of intersection points of the second center line CL2 with the surface 20, the intersection point located on the side opposite to the second point P2.

In the first end turn portion 11, the first area A1 and the second area A2 are arranged in the circumferential direction D. In the embodiment, a border B1 between the first area A1 and the second area A2 is located between the second point P2 and the third point P3. Another border B2 between the first area A1 and the second area A2 is located at the fourth point P4. The first area A1 is formed in a range from the fourth point P4 (border B2) to border B1 in the circumferential direction Dθ and includes the first point P1 and the second point P2. The second area A2 is formed in a range from border B1 to the fourth point P4 (border B2) in the circumferential direction Dθ and includes the third point P3.

Thus, on the section of FIG. 4, the length of the second area A2 in the circumferential direction Dθ is shorter than that of the first area A1 in the circumferential direction Dθ. The second area A2 is formed on the lower side in the axial direction DX so as to be close to the internal side of the coil spring 1 in the surface 20 of the wire 2. The third point P3 and an area located near the third point P3 correspond to a seat surface SF which is in contact with the first spring seat 4 shown in FIG. 1 at all times or when the coil spring 1 is compressed. In other words, the second area A2 is formed in at least part of the seat surface SF of the first end turn portion 11.

More specifically, for example, when the first point P1, the second point P2, the third point P3 and the fourth point P4 are regarded as 0 o'clock, 3 o'clock, 6 o'clock and 9 o'clock, respectively, the second area A2 is formed in a range from 4 o'clock to 9 o'clock.

The range in which the second area A2 is formed is not limited to the range from 4 o'clock to 9 o'clock. For example, the second area A2 should be formed such that its center C is located in a range from the second point P2 to the fourth point P4 in the circumferential direction D. The center C is a position which is equidistant from borders B1 and B2 in the circumferential direction D. Suitably, the center C is located in a range from the third point P3 to the fourth point P4 in the circumferential direction D.

The first end turn portion 11 does not necessarily comprise the cross-sectional structure shown in FIG. 4 at all positions. In the example of FIG. 2, the second area A2 is not provided in a portion 11*a* having a certain distance from the end 2*a*. This portion 11*a* is a portion which is in contact with the first spring seat 4 at all times regardless of the compressed state of the coil spring 1 in, for example, a state where the coil spring 1 is incorporated into the suspension device 100. From another viewpoint, in the example of FIG. 2, the second area A2 is provided in a portion which contacts or separates from the first spring seat 4 depending on the load applied to the coil spring 1.

Suitably, the second area A2 is formed at least in a range greater than or equal to 0.4 turns and less than or equal to 0.9 turns from the end 2*a*. However, the second area A2 may be formed so as to exceed this range or so as to be smaller than this range. In addition, the second area A2 may be continuously formed in a certain range from the end 2*a*.

In the example of FIG. 4, the thickness t of the second layer L2 is the greatest in the center C. Thickness t gradually decreases from the center C to borders B1 and B2. Thickness t in the center C is, for example, greater than or equal to 0.6 mm and should be preferably greater than or equal to 1.0 mm. In terms of the relationship with the diameter R of the wire 2, thickness t in the center C is, for example, greater than or equal to 2% of diameter R and less than or equal to 8%.

Figure 5:
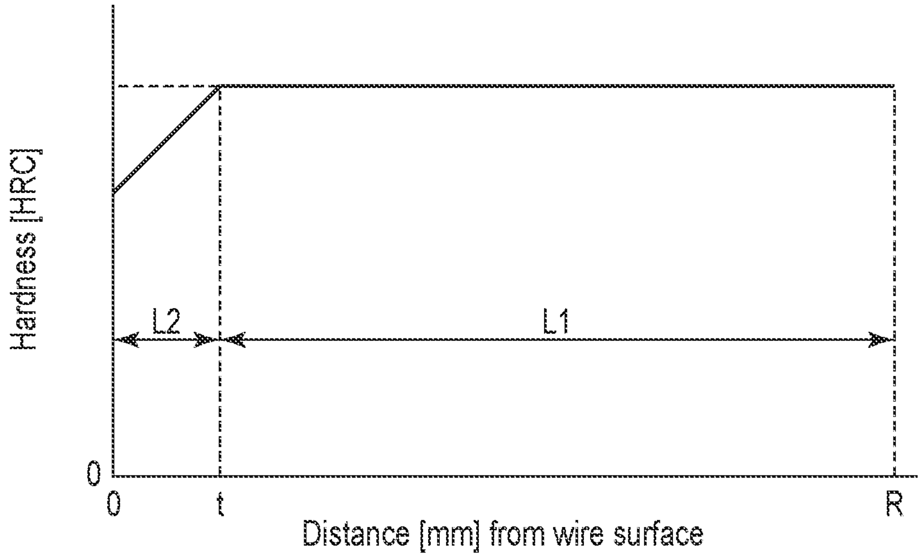
FIG. 5 is a graph showing an example of the hardness distribution inside the wire of the coil spring.

FIG. 5 is a graph showing an example of the hardness distribution of the wire 2 along the center C of FIG. 4. In this graph, the horizontal axis represents the distance [mm] from the surface 20 of the wire 2, and the vertical axis represents Rockwell hardness [HRC].

In the example of FIG. 5, the hardness of the first layer L1 is substantially constant. In the second layer L2, the hardness in the surface 20 (second area A2) is the least, and the hardness gradually increases with increasing distance from the surface 20 and reaches the hardness of the first layer L1 at the position of thickness t. Thus, the second layer L2 is softer than the first layer L1 as a whole. The hardness of the second layer L2 has a gradient depending on the distance from the surface 20.

Figure 6:
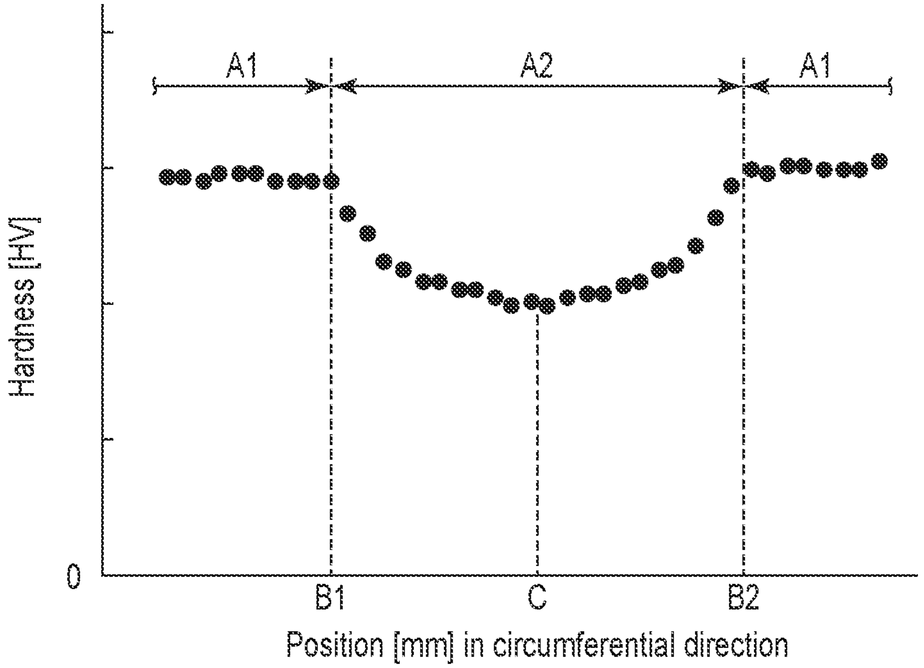
FIG. 6 is a graph showing an example of the hardness distribution on the surface of the wire.

FIG. 6 is a graph showing an example of the hardness distribution of the surface 20 in the circumferential direction D. In this graph, the horizontal axis represents the position [mm] in the circumferential direction Dθ on the surface 20, and the vertical axis represents Vickers hardness [HV].

In the example of FIG. 6, the hardness of the first area A1 is substantially constant. In the second area A2, the hardness near the center C is the least. Between the center C and border B1 and between the center C and border B2, the hardness gradually increases with increasing distance from the center C and reaches the hardness of the first area A1 in borders B1 and B2. Thus, the second area A2 is softer than the first area A1 as a whole. The hardness of the second area A2 has a gradient in which the center C has the least value.

Figure 7:
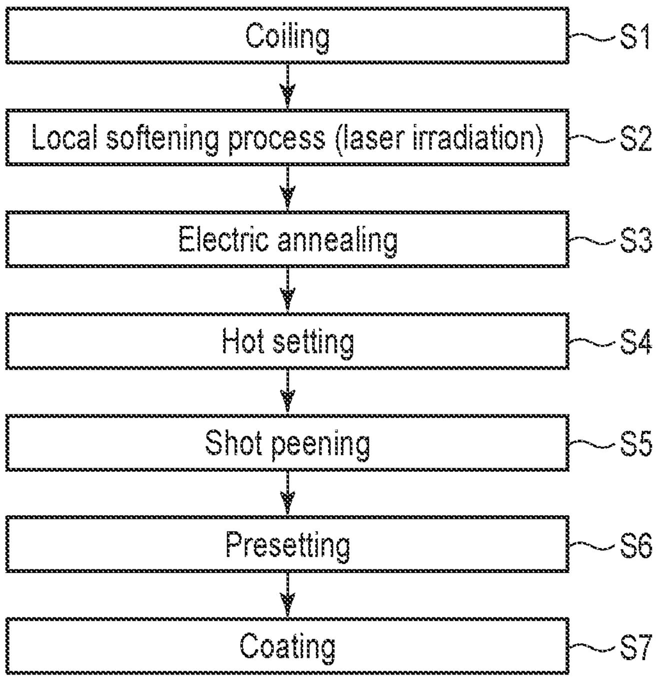
FIG. 7 is a flowchart showing an example of a method for producing the coil spring.

FIG. 7 is a flowchart showing an example of a method for producing the coil spring 1. First, the wire 2 is helically wound by a coiling machine, and this wound portion is cut by a cutter (step S1). At this point, the surface 20 of the wire 2 has the same hardness as a whole. Subsequently, a local softening process for forming the second area A2 on the surface is applied (step S2). The details of the local softening process are explained later with reference to FIG. 8.

After the local softening process, electric annealing is applied to the wire 2 (step S3). In this electric annealing, for example, the wire 2 is heated for one minute or less in a temperature range of 400 to 500° C. After the electric annealing, hot setting which applies an excessive load to the wire 2 is performed in a state where the wire 2 is heated (step S4).

Subsequently, shot peening is applied to the wire 2 (step S5), and further, presetting is applied to the wire 2 (step S6). Subsequently, the coating film 21 is formed as a whole relative to the surface 20 of the wire 2 (step S7). It should be noted that the local softening process should be applied before the shot peening. The local softening process may be applied after the electric annealing or after the hot setting.

Figure 8:
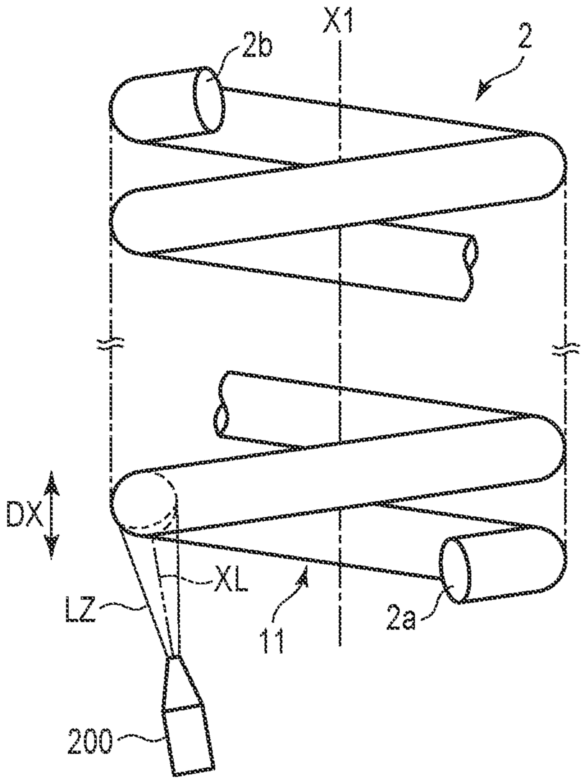
FIG. 8 is a diagram showing an example of a local softening process which is applied to the wire when the coil spring is produced.

FIG. 8 is a diagram showing an example of a local softening process. In the embodiment, a laser device 200 is used for a local softening process. For example, the laser device 200 is a semiconductor laser. However, the laser device 200 is not limited to this example.

The laser device 200 applies laser light LZ to the range in which the second area A2 should be formed in the first end turn portion 11. When the second area A2 is formed in a range from 4 o'clock to 9 o'clock as shown in FIG. 4, the irradiation axis XL of laser light LZ is inclined with respect to the axial direction DX. The position at which the irradiation axis XL intersects with the surface 20 corresponds to the center C shown in FIG. 4.

When laser light LZ is applied, for example, the wire 2 may be rotated around the coil axis X1 while fixing the position of the laser device 200. In this case, the wire 2 may be moved in the axial direction DX in association with the rotation of the wire 2 such that the distance between the portion irradiated with laser light LZ in the wire 2 and the laser device 200 can be constant. In this manner, the deviation of the focal point of laser light LZ can be prevented. As another example, the laser device 200 may be moved while fixing the wire 2.

By the irradiation with laser light LZ, the wire 2 is heated. By this heating, a heat affected zone (HAZ) is formed in the wire 2. When the heat affected zone is air-cooled, the second layer L2 whose hardness is reduced relative to the original wire 2 is generated.

For example, the portion irradiated with laser light LZ in the wire 2 is heated so as to be in a temperature range less than an austenitizing starting temperature. At a position corresponding to the irradiation axis XL, the portion from the surface 20 to at least depth 0.6 mm (or the portion from the surface to a depth greater than or equal to 2% of diameter R and less than or equal to 8%) should be preferably heated so as to be in the above temperature range.

It should be noted that, if the temperature of the wire 2 at the time of heating is too high, quench hardening may occur in part of the wire 2, and thus, the hardness could be increased compared with that before the irradiation with laser light LZ. The output [kW] of laser light LZ and the irradiation time [sec] need to be adjusted so as not to cause this quench hardening.

It should be noted that the production method explained using FIG. 7 and FIG. 8 is merely an example. The coil spring 1 can be produced by various other types of methods.

In the above embodiment, in the first end turn portion 11 of the coil spring 1, the surface 20 of the wire 2 comprises the first area A1 and the second area A2. Since the second area A2 is softer than the first area A1, even if a corrosion pit is generated in the second area A2, this corrosion pit does not easily develop to a crack of the wire 2. Even if a crack is generated, the development can be delayed. Thus, the corrosion fatigue resistance of the first end turn portion 11 is improved by providing the second area A2 in the first end turn portion 11.

If the second area A2 (second layer L2) is formed in the wire 2 as a whole, the settling resistance of the coil spring 1 could be decreased. To the contrary, in the embodiment, the second area A2 is not formed in the effective portion 10. Therefore, settling resistance can be satisfactorily maintained in the effective portion 10. As the first end turn portion 11 is a portion whose action stress is less than that of the effective portion 10, even if the second area A2 is provided in the first end turn portion 11, the settling resistance of the whole coil spring 1 is not easily affected.

The first end turn portion 11 is a portion which is in contact with the first spring seat 4 provided on the lower side. Thus, if a foreign object such as sand gets into the portion between the first end turn portion 11 and the first spring seat 4, the coating film 21 is damaged as the suspension device 100 is used, and a corrosion pit is easily generated in the first end turn portion 11. To the contrary, in the embodiment, the second area A2 is provided in a range including the seat surface SF of the first end turn portion 11. For this reason, even if a corrosion pit is generated as a foreign object gets into the portion between the first end turn portion 11 and the first spring seat 4, a crack to be caused by this corrosion pit can be prevented.

Moreover, the above foreign object easily gets into the lower side of the portion which contacts or separates from the first spring seat 4 in the first end turn portion 11. Therefore, when the second area A2 is locally formed in this portion, corrosion fatigue resistance can be effectively improved while maintaining the settling resistance of the coil spring 1. In this regard, a range from the end **2*a* to 0.4 turns or greater and 0.9 turns or less is an area in which a corrosion pit by a foreign object is easily generated. In this range, a stress is easily applied when the coil spring 1 is compressed compared with a range from the end 2*a*** to 0.4 turns. For this reason, as described with reference to FIG. 2, the second area A2 should be preferably formed at least in a range greater than or equal to 0.4 turns and less than or equal to 0.9 turns from the end 2*a*.

A stress is easily applied to, of the surface of the wire 2, the portion on the coil axis X1 side (the internal side of the coil spring 1), and corrosion fatigue is also easily caused. Thus, as described with reference to FIG. 4, the second area A2 should be preferably formed so as to be close to the internal side of the coil spring 1.

In the embodiment, a case using laser light for a local softening process is shown as an example. However, a local softening process may be performed by another method such as high-frequency heating. It should be noted that, as exemplarily shown with reference to FIG. 8, when laser light is used for a local softening process, the second area A2 can be formed in a short time compared with cases where the wire 2 is heated by other methods. If the wire 2 is heated by another method such as high-frequency heating, the local increase in the temperature of the wire 2 may be difficult in some cases. In this regard, when laser light is used, a specific portion of the wire 2 can be accurately heated.

Various other favorable effects can be obtained from the embodiment.

Second Embodiment

In a second embodiment, other configurations which could be applied to a coil spring 1 are shown as examples. Configurations which are not particularly referred to regarding the coil spring 1 and a suspension device 100 are similar to those of the first embodiment.

Figure 9:
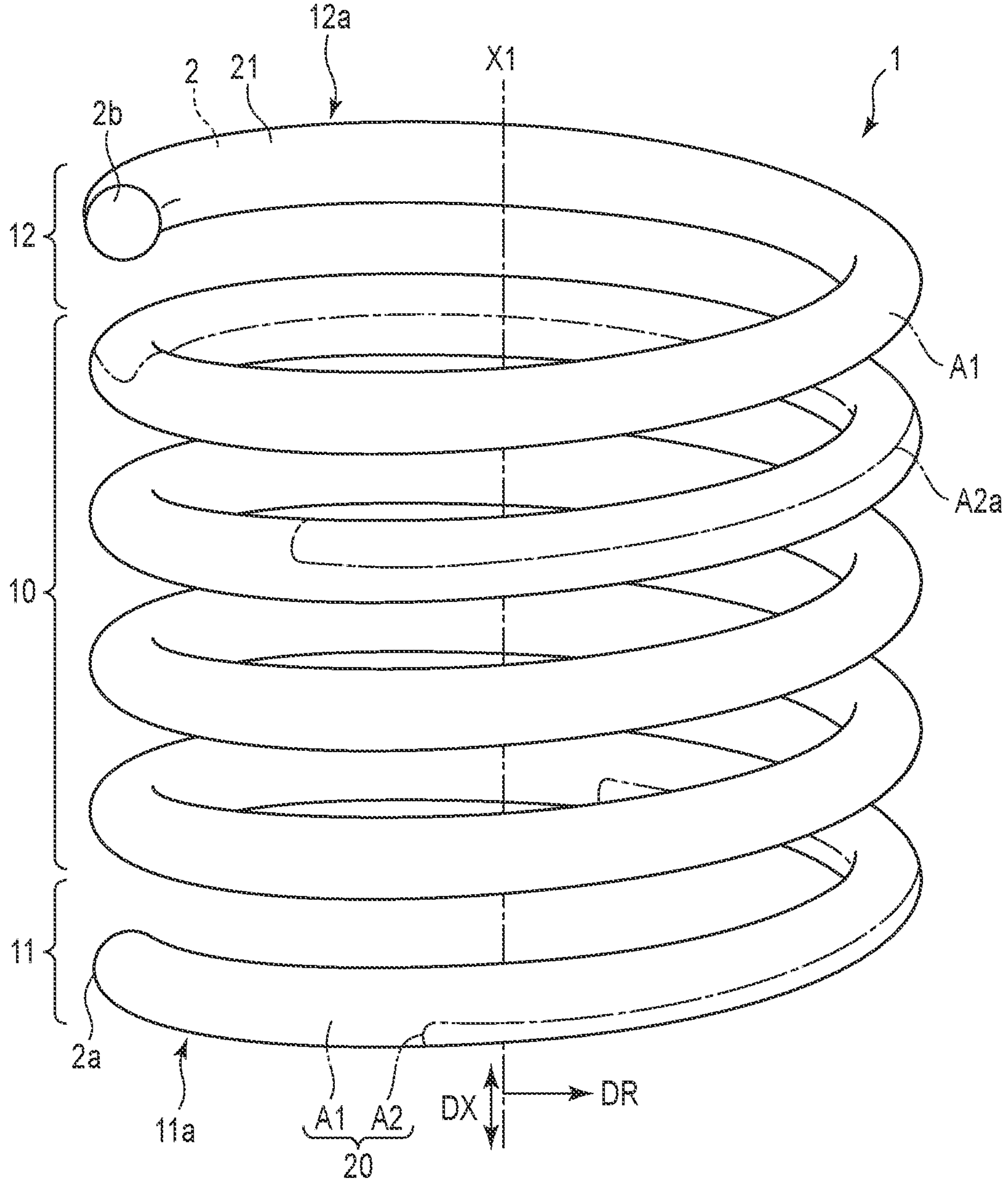
FIG. 9 is a schematic perspective view of a coil spring according to a second embodiment.

FIG. 9 is a schematic perspective view of the coil spring 1 according to the second embodiment. As shown in FIG. 9, in the embodiment, a second area A2 (second area A2*a*) is also formed in, of the surface 20 of a wire 2 in an effective portion 10, a range which could be in contact with a second end turn portion 12 at the time of compression.

In the example of FIG. 9, the second area A2*a* is not formed in a portion 12*a* having a certain distance from an end 2*b*. Specifically, in the example of FIG. 9, the second area A2*a* is formed in a range greater than or equal to 1 turn and less than or equal to 2 turns from the end 2*b*. As another example, the second area A2*a* may range in the second end turn portion 12. Further, the second area A2*a* may range in the end 2*b*.

The cross-sectional structure of the portion including the second area A2*a* is similar to a structure obtained by inverting the cross-sectional structure shown in FIG. 4 up and down. It should be noted that the range for forming the second area A2*a* in a circumferential direction Dθ may be appropriately changed. In the example of FIG. 9, the second area A2*a* is formed in the portion facing the second end turn portion 12 on the surface 20 of the effective portion 10. This portion is a portion which could be in contact with the second end turn portion 12 when the coil spring 1 is compressed. Even if a corrosion pit is generated in the wire 2 because of this contact, development to a crack is prevented by the second area A2*a*.

Third Embodiment

In a third embodiment, yet other configurations which could be applied to a coil spring 1 are shown as examples. Configurations which are not particularly referred to regarding the coil spring 1 and a suspension device 100 are similar to those of the first embodiment.

Figure 10:
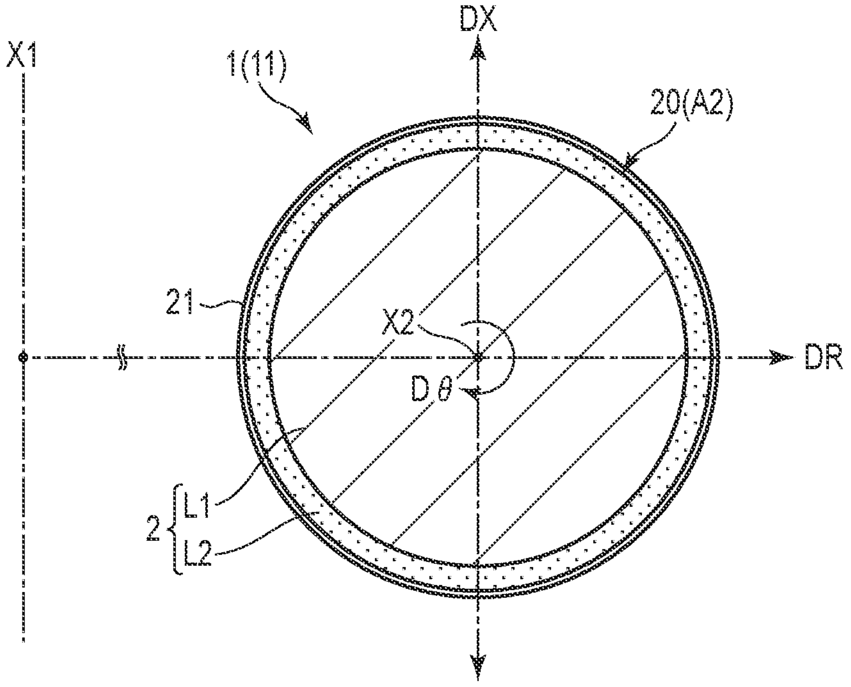
FIG. 10 is a schematic cross-sectional view of a coil spring according to a third embodiment.

FIG. 10 is a schematic cross-sectional view of the coil spring 1 according to the third embodiment. This section corresponds to, for example, part of a first end turn portion 11. It should be noted that a similar structure may be applied to a second end turn portion 12.

In the example of FIG. 10, a second layer L2 covers a first layer L1 over the whole circumference of a circumferential direction Dθ. In other words, the surface 20 of a wire 2 is formed by a second area A2 over the whole circumference. In the example of FIG. 10, the thickness of the second layer L2 is constant in the circumferential direction Dθ. It should be noted that the thickness of the second layer L2 may be locally changed.

For example, this second area A2 is formed at least in a range greater than or equal to 0.4 turns and less than or equal to 0.9 turns from an end 2*a* in a manner similar to that of the first embodiment. A portion in which the second area A2 is not formed may be present between the second area A2 and the end 2*a*. In addition, the second area A2 may be continuously formed in a certain range from the end 2*a*.

An effective portion 10 is formed by the first layer L1 as a whole in a manner similar to that of the example of FIG. 3. In other words, the surface in the effective portion 10 is a first area A1 as a whole.

Even the configuration of this embodiment can improve the corrosion fatigue resistance of the first end turn portion 11 and the second end turn portion 12. By forming the effective portion 10 by the first layer L1 as a whole, good settling resistance can be imparted to the coil spring 1.

The first to third embodiments described above do not limit the scope of the present invention to the configuration disclosed in these embodiments. The present invention can be implemented by modifying the configuration disclosed in each embodiment in various ways.

For example, in the first and second embodiments, the second area A2 may be formed in the portion facing the effective portion 10 on the surface of the first end turn portion 11. The second area A2 may be formed in a portion which contacts or separates from the second spring seat 5 depending on the load applied to the coil spring 1 in the second end turn portion 12. Further, the second area A2 may not be formed in the first end turn portion 11 when the second area A2 is formed in the second end turn portion 12. The second area A2 may range in part of the effective portion 10.

The wire 2 may comprise a multilayer structure which further includes another layer whose hardness is different from the hardnesses of the first layer L1 and the second layer L2. For example, when another layer ranges in the surface 20 of the wire 2, an area whose hardness is different from the hardnesses of the first area A1 and the second area A2 could be additionally formed on the surface 20.

Each embodiment discloses the coil spring 1 in which the wire 2 is cylindrically wound. However, the coil spring 1 may have another shape such as a barrel shape in which the diameter decreases toward the first end turn portion 11 and the second end turn portion 12.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring formed of a wire which is helically wound and comprising an end turn portion and an effective portion, wherein a surface of the wire in the end turn portion comprises a first area, and a second area which is softer than the first area and is adjacent to the first area in a circumferential direction around an axis of the wire, and wherein the surface of the wire in the effective portion comprises the first area over a whole circumference in the circumferential direction.

2. The coil spring of claim 1, wherein in a section of the wire including the first area and the second area, the surface of the wire comprises:

a first point which is, of a pair of intersection points of a first center line passing through the axis of the wire and parallel to a coil axis with the surface of the wire, an intersection point located on the effective portion side;

a second point which is, of a pair of intersection points of a second center line passing through the axis of the wire and parallel to a radial direction around the coil axis with the surface of the wire, an intersection point located on a far side from the coil axis;

a third point which is, of the pair of intersection points of the first center line with the surface of the wire, an intersection point located on a side opposite to the first point; and a fourth point which is, of the pair of intersection points of the second center line with the surface of the wire, an intersection point located on a side opposite to the second point, and wherein a center of the second area is located between the second point and the fourth point in the circumferential direction passing through the first point, the second point, the third point and the fourth point in order.

3. The coil spring of claim 2, wherein the center of the second area is located between the third point and the fourth point in the circumferential direction.

4. The coil spring of claim 1, wherein the wire comprises:

a first layer including the first area; and a second layer which includes the second area and is softer than the first layer, and wherein the axis of the wire passes through the first layer in the end turn portion.

5. The coil spring of claim 1, wherein the second area is formed in at least part of a seat surface of the end turn portion.

6. The coil spring of claim 1, wherein the second area is formed at least in a range greater than or equal to 0.4 turns and less than or equal to 0.9 turns from an end of the wire in the end turn portion.

7. The coil spring of claim 1, wherein the second area has a thickness greater than or equal to 0.6 mm.

8. A suspension device comprising:

a first spring seat;

a second spring seat provided on an upper side in a perpendicular direction relative to the first spring seat; and the coil spring of claim 1, provided between the first spring seat and the second spring seat.

9. A method for producing a coil spring, comprising:

forming a coil spring comprising an end turn portion and an effective portion by winding a wire helically; and softening part of the wire by locally applying laser light to a surface of the wire in at least part of the end turn portion, wherein, after the softening, the surface of the wire in the end turn portion comprises a first area, and a second area which is softer than the first area and is adjacent to the first area in a circumferential direction around an axis of the wire, and wherein the surface of the wire in the effective portion comprises the first area over a whole circumference in the circumferential direction.

* * * * *